(12) United States Patent
Rullmann

(10) Patent No.: US 12,045,690 B2
(45) Date of Patent: Jul. 23, 2024

(54) GOODS AND METHOD FOR CHECKING AN AUTHORIZATION TO RETRIEVE ELECTRONICALLY PROVIDED CONTENT BY READING OUT AN INFORMATION CARRIER OF GOODS

(71) Applicant: Peter Rullmann, Saarbrücken (DE)

(72) Inventor: Peter Rullmann, Saarbrücken (DE)

( * ) Notice: Subject to any disclaimer, the term of this patent is extended or adjusted under 35 U.S.C. 154(b) by 85 days.

(21) Appl. No.: 17/768,227

(22) PCT Filed: Oct. 14, 2020

(86) PCT No.: PCT/EP2020/078949
§ 371 (c)(1),
(2) Date: Apr. 12, 2022

(87) PCT Pub. No.: WO2021/074246
PCT Pub. Date: Apr. 22, 2021

(65) Prior Publication Data
US 2023/0351129 A1    Nov. 2, 2023

(30) Foreign Application Priority Data

Oct. 15, 2019   (DE) .......................... 102019127650.0

(51) Int. Cl.
*G06K 7/14*      (2006.01)
*G06F 21/10*     (2013.01)
*H04L 9/08*      (2006.01)
*H04L 9/32*      (2006.01)

(52) U.S. Cl.
CPC .......... *G06K 7/1417* (2013.01); *G06F 21/10* (2013.01); *H04L 9/088* (2013.01); *H04L 9/3247* (2013.01)

(58) Field of Classification Search
CPC ...... G06K 7/1417; H04L 9/088; H04L 9/3247
See application file for complete search history.

(56) References Cited

U.S. PATENT DOCUMENTS

2010/0032478 A1*   2/2010   Deng ..................... B65D 79/02
                                                   235/375
2018/0019872 A1*   1/2018   Radocchia ............ G06F 21/445

FOREIGN PATENT DOCUMENTS

DE   102005015357 A1   10/2006
DE   202018104005 U1   10/2019

* cited by examiner

*Primary Examiner* — Matthew Mikels
(74) *Attorney, Agent, or Firm* — Michael Soderman

(57) ABSTRACT

A sales item which has an information carrier which can be read by a reader, on said information carrier various sales item states are stored. Expediently, damage to the information carrier causes an irreversible change of state of the sales item. Advantageously, a reliable protection against unauthorized retrieval of the contents is created. Further, a method for verifying an authorization to retrieve an electronically provided content by reading an information carrier of a sales item.

5 Claims, 3 Drawing Sheets

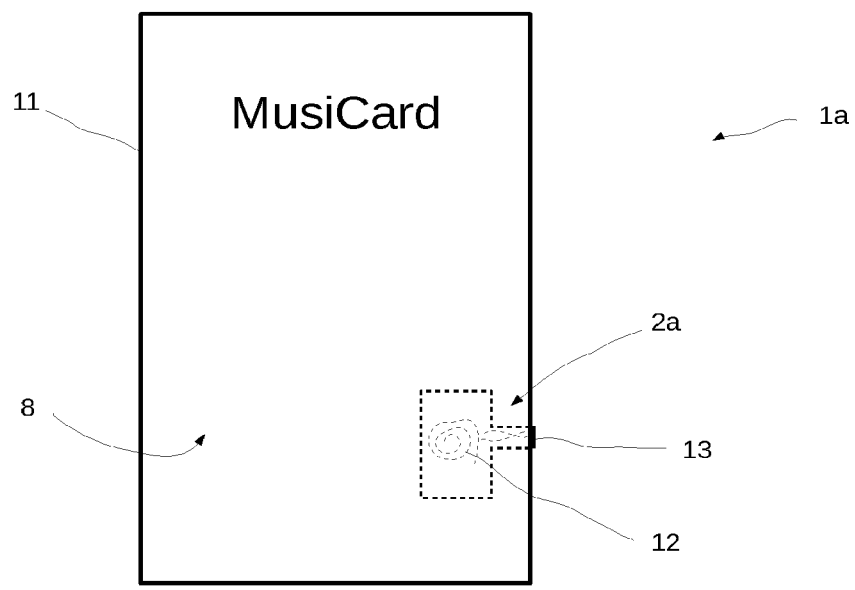
Fig. 2a
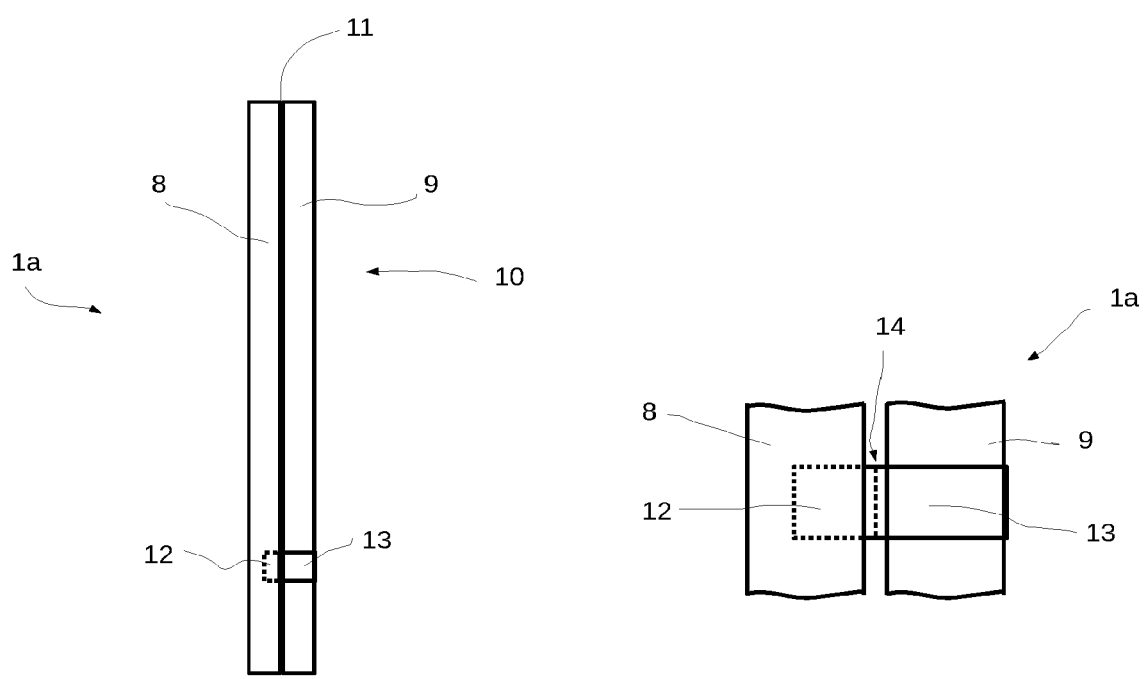
Fig. 2b
Fig. 2c

GOODS AND METHOD FOR CHECKING AN AUTHORIZATION TO RETRIEVE ELECTRONICALLY PROVIDED CONTENT BY READING OUT AN INFORMATION CARRIER OF GOODS

CROSS REFERENCE TO RELATED APPLICATIONS

This application is the U.S. national stage of International Application No. PCT/EP2020/078949, filed on 2020 Oct. 14. The international application claims the priority of DE 102019127650.0 filed on 2019 Oct. 15; all applications are incorporated by reference herein in their entirety.

BACKGROUND

The invention relates to a sales item which has an information carrier that can be read by a reader, on said information carrier various sales item states are stored. Furthermore, the invention relates to a method for verifying an authorization to retrieve an electronically provided content by reading an information carrier of a sales item.

QR codes are known from prior art which, when read with a cell phone for example, redirect to an Internet page.

SUMMARY

The invention relates to a sales item (1; 1a) which has an information carrier (2; 2a) which can be read by a reader, on said information carrier various sales item states are stored. Expediently, damage to the information carrier (2; 2a) causes an irreversible change of state of the sales item (1; 1a). Advantageously, a reliable protection against unauthorized retrieval of the contents is created.

Furthermore, the invention relates to a method for verifying an authorization to retrieve an electronically provided content by reading an information carrier (2; 2a) of a sales item (1; 1a).

DETAILED DESCRIPTION

An object of the present invention is to create a sales item of the afore-mentioned type which prevents unauthorized access to the sales item, which may be electronically provided content, for example a streamable content such as music or video data or image data.

According to the invention, the object is achieved in that damage to the information carrier causes an irreversible change of state of the sales item.

Another object of the invention is to create a method that prevents unauthorized access to the sales item.

According to the invention, the object is achieved by reading the information carrier, a dynamic address to a server in a computer network is created, which address has at least one security feature and which address depends on a sales item state.

Since an irreversible change of state is effected, it is advantageously prevented that a sales item is used and its content is being removed unnoticed or accessed without authorization. Particularly in case of vouchers that can be redeemed online or sales items that allow access to streaming content such as music tracks or movies using a cell phone, laptop or tablet computer, it must be ensured that the content can only be accessed by an authorized purchaser once it has been purchased.

Since a dynamic address at which a content can be retrieved is provided with at least one security feature and said dynamic address is preferably dependent on a sales item state, a sales item state check can advantageously be carried out in order to release a content completely or partially or to display an error message to a user of the reader. Advantageously, said security feature effects copy protection that is effective even when a dynamic address is known and does not grant access. Further advantageously, verification of authorization is not required if the sales item is unopened. For example, if the sales item is in a basic item sate in which there is no damage to the information carrier, it is possible to proceed to a preview of the contents. It is advantageously possible to preview the contents.

For example, the sales item can be a card that is provided with an information carrier and a personal message, such as a cardboard or greeting card.

It is expedient to store two sales item states on the information carrier, of which either a first or a second state can be read by the reader, which is preferably a mobile telephone or tablet capable of establishing a data connection. For example, the information carrier may have a QR (quick response) code, an RFID or an NFC transponder. If the information carrier is read, a user of the reader, in particular a reader with Internet connection, can either be directly shown an indication of the sales item status on a reader screen or can be forwarded to a server in a computer network from which the status can be retrieved. Advantageously, a prospective buyer can be informed of the state of said sales item in a tamper-proof manner. This makes it easy to check whether the sales item has already been opened and/or used.

In one embodiment of the invention, a first sales item state comprises information about the sales item, in particular about content that can be retrieved via a computer network, preferably about a music or video stream. If the information carrier is undamaged, information relating to the sales item, for example a playlist or a short excerpt of a streamable or downloadable content, can be displayed or played to a prospective purchaser when the information carrier is read, for example with a mobile telephone. Advantageously, there is a possibility for previewing.

It is also conceivable that, when the excerpt is retrieved, a data connection is established to a server in a computer network that determines how often excerpts are retrieved before a purchase. Advantageously, a statistical evaluation of purchasing behavior is possible.

In a further embodiment of the invention, a second sales item state is retrievable only after the irreversible change of state of the information carrier and preferably comprises full access to a content retrievable from a computer network, in particular to a music or video stream. Advantageously, it is ensured that there is no unauthorized access to the sales item. Preferably, the second sales item state allows full access to a streamable or downloadable content, while a first sales item state allows only a preview or playback of a short excerpt.

It is expedient to store an electronic key on the information carrier, which is provided for creating a signature or for encrypting and/or decrypting data. Advantageously, a signature created with the key can be used to verify the authenticity of the sales item. If the information carrier is read and if it is forwarded to a server, a database stored there can be used to check whether an electronic signature generated with the electronic key authorizes retrieval of a content.

It is also conceivable that the key or its hash value is a security feature of a dynamic address (URL; Uniform Resource Locator) that is generated when the information carrier is read and that leads to a server in a computer network. A computer program running on the server may be set up to verify the signature, determine the sales item state and a quantity of previous retrievals. For example, if the signature is correct, full access to the content is granted. If the signature is incorrect, only a preview of the content or an error message is shown.

Although it is conceivable that one key could be provided for each sales item state, a single key is provided for both sales item states.

Furthermore, it is conceivable that retrievable content on the server is at least partially encrypted, and can be decrypted by the electronic key.

Preferably, decryption is performed only after a sales item state and an authorization check to retrieve the content. Advantageously, it is ensured that only an authorized user of the reader has access to the retrievable content and even an operator of the server from which the content is retrieved does not have any data providing an indication of the content or the content itself. Discreet provision of a content is possible.

It is understood that the data deposited on the server may also be encrypted with the electronic key of the information carrier.

In one embodiment of the invention, the information carrier forms the sales item. The information carrier is preferably in the form of a RFID or NFC transponder that can be stuck on, for example, a greeting card and enables a recipient to retrieve an individualized content via a computer network by reading the information carrier. Such content can in particular be photos, videos or sound recordings. The sales item is opened by damaging the information carrier, for example by actuating a tab. Advantageously, individualization of both the content and a carrier card is particularly well possible. The information carrier can be attached flexibly and can also be used, for example, as an advertising medium at locations relevant to advertising.

Expediently, the information carrier can be read without contact. Advantageously, particularly simple handling is possible. If the information carrier includes an NFC transponder, it is advantageously not possible to read it over long distances. Unauthorized reading is made more difficult. In addition, an NFC transponder can be read easily with a cell phone or tablet computer.

In a further embodiment of the invention, the information carrier is of a two-part design, wherein a first part is detachably connected to a second part. The two parts may, for example, be connected to each other at a predetermined breaking line. By actuating a connecting tab, the first part can be separated from the second part, causing the irreversible change of state. Herein, electrical pathways can be severed, for example.

Advantageously, an opened and possibly used sales item can easily be recognized visually.

In one embodiment of the invention, the sales item comprises at least two pivotably interconnected sales item parts which, in an unopened state, form a stack sealed by the information carrier. To open the sales item by unfolding the stack, for example, a connecting tab of the information carrier can be severed along a predetermined breaking line. This causes said irreversible change of state.

If a dynamic address for retrieving content from a server in a computer network is generated when the information carrier is read, a counter value stored on the information carrier can be integrated into the dynamic address, which is incremented by a certain value, for example 1, with each retrieval. In particular, a counter value can be monitored by software executed on a server on which the content is stored. As a result, the dynamically generated address can be retrieved only once, and an error message is displayed if a further retrieval attempt is made. Copy protection is advantageously effected.

It is expedient to include a unique identifier characteristic of the sales item and/or the information carrier in the dynamic address when creating the dynamic address. Advantageously, an additional security feature is created that improves protection against counterfeiting and thus possible unauthorized access. Such an identifier can, for example, be a serial number.

In one embodiment of the method according to the invention, before a retrievable content is transmitted, it is checked whether the dynamic address at which the content is to be retrieved is authorized to retrieve the content. For this purpose, for example, a counter value can be checked which is increased by 1 with each authorized retrieval. Further, this counter value is stored on the information carrier to be used to generate another dynamic address when the content is retrieved again. The counter value is a possible security feature that provides simple protection against disclosure of a dynamic address, since the address can only be accessed once with the specified counter value.

It is also conceivable that a dynamic part of the address has an electronic signature that can be verified on the server and is generated using an electronic key stored on the information carrier.

It is also conceivable that a first part of a dynamic address and a key stored on the information carrier are used to determine a hash value which is appended to the first part as a further part and which can be used to check the first part of the address. Advantageously, a further copy protection stage is achieved.

In one embodiment of the method according to the invention, a content that can be retrieved preferably after a change of state of the sales item can be modified by a user of the reader. A modification means, for example, adding, modifying or deleting files to change the retrievable content.

In particular, it may be provided that the dynamic address at which the content is retrievable is used to check whether the content is intended for modification at all, for example by a request to a server from which the content is retrievable. Advantageously, manipulations of content are prevented.

It is also conceivable that an electronic key stored on the information carrier is used for encryption and decryption to encrypt content locally on the reader and upload it to a server accessible at the dynamic address.

BRIEF DESCRIPTION OF THE DRAWINGS

Embodiments of the invention are to be explained in more detail below on the basis of examples with reference to the non-limiting figures. It is shown.

DETAILED DESCRIPTION OF THE PREFERRED EMBODIMENTS

Figure 1A:
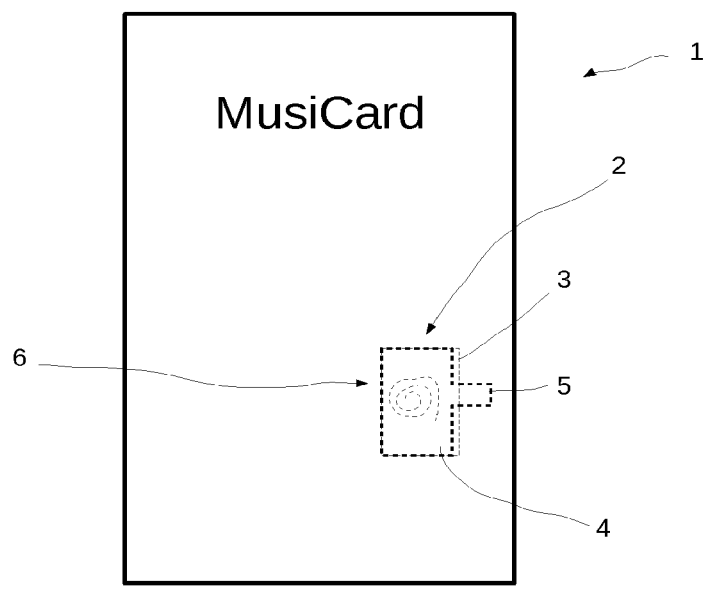
FIG. 1 a first embodiment of a sales item,
FIG. 2 another embodiment of a sales item,
FIG. 3 an embodiment of a method according to the invention.

An information carrier (2) that can be read by a cell phone not shown in FIG. 1a is attached to a carrier card (1) shown schematically in a plan view in FIG. 1a. From the information carrier, an address of a server in a computer network can be read electronically and contactless by the cell phone. A retrievable content, which in this embodiment is several pieces of music, can be transferred to the cell phone and played back.

The information carrier (2) is of a two-part design and comprises a NFC transponder (near-field communication; 3), which has an additional tab (4) that is connected both mechanically and electrically to the NFC transponder (3). By actuating a grip part (5) of the tab (4), the latter is separated from the NFC transponder (3) along a vertical predetermined breaking line (6).

Figure 1B:
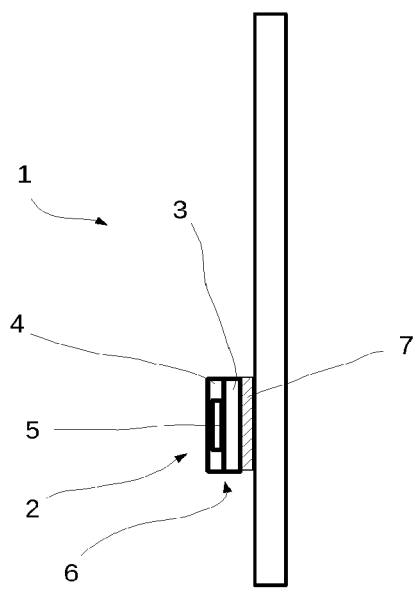

In a basic sales item state shown in FIG. 1b, in which the tab (4) has not been actuated, a user of the cell phone is redirected to the server from which excerpts of music tracks ("preview") can be streamed and listened to in the basic sales item state when the NFC transponder (3) is read.

Figure 1C:
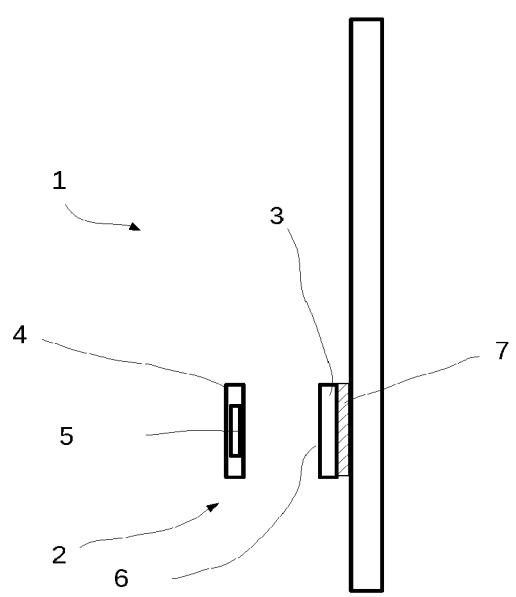

When the handle (5) is actuated, the tab (4) is detached and the sales item is in a full access sales item state shown in FIG. 1c, in which a user of the cell phone is redirected to the server from which all full-length music tracks can be streamed if authorized to do so.

An information carrier (2) of a carrier card (1) shown schematically in a side view in FIGS. 1b and c is adhered to the carrier card (1) by an adhesive layer (7).

In a carrier card (1) shown schematically in a side view in FIG. 1c, an NFC transponder (3) is separated by a tab (4) along a predetermined breaking line (6).

It is conceivable that the information carrier (2) forms the sales item and is glued onto any carrier (1).

Reference is now made to FIG. 2, where identical or equal-acting parts are designated with the same reference number as in FIG. 1, and the letter a is added to the respective reference number.

Figure 2D:
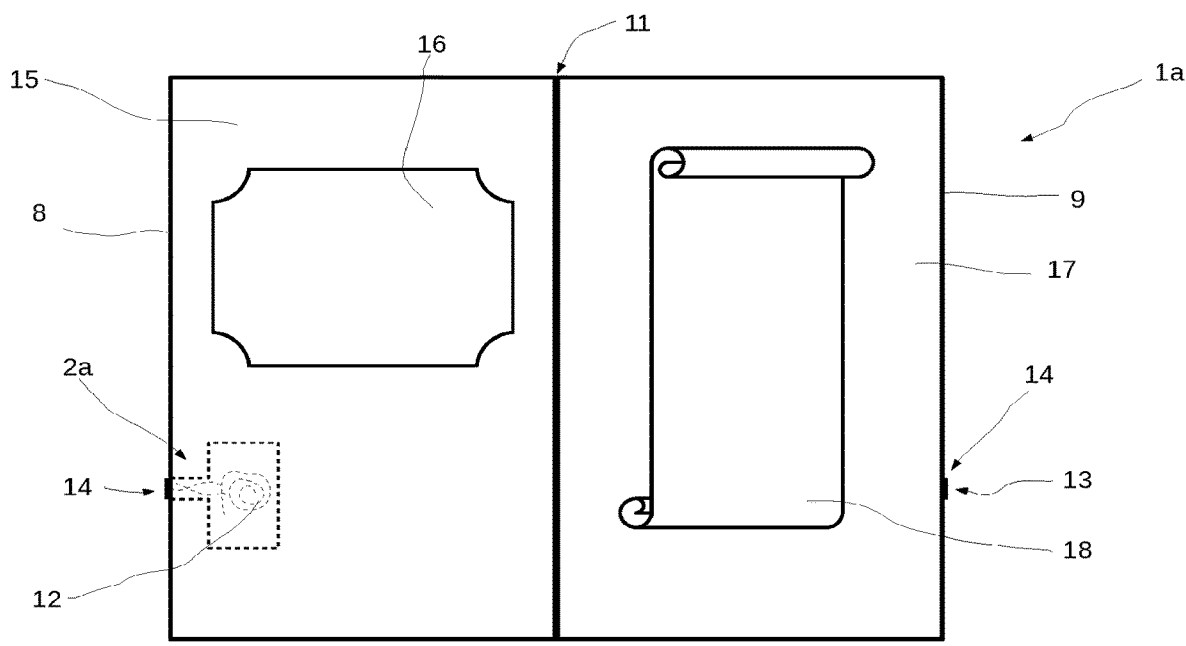

A multi-part paperboard card (1a) shown schematically in FIG. 2a in a plan view and in FIG. 2b in a side view comprises two paperboard card parts (8, 9) pivotably connected to one another, which in an unopened state form a sealed stack (10) and are pivotably connected to one another at one longitudinal side (11). Shown state is a basic sales item state. A seal (2a) includes a NFC transponder (12) inserted into a first card part (8) and a closure tab (13) folded over and adhered to a second card part (9). The closure tab (13) is provided with a predetermined breaking line (14) shown in a detailed view in FIG. 2c, at which the tab (14) is separated when the cardboard card (1a) is opened, in order to be brought into an opened state shown in FIG. 2d. This state is the full access sales item state.

The NFC transponder (12) has two electrical circuits not shown in FIG. 2, a first of which can be read by a cell phone not shown when the cardboard card (1a) is unopened, and a second of which can only be read when the cardboard card (1a) is opened and the sealing tab (13) has been separated along the predetermined breaking line (14).

In this embodiment, music retrievable via the Internet can be streamed by reading the NFC transponder (12), either a preview of the content in the basic sales item state or all songs of a playlist in the full access sales item state.

On a first inner side (15) of the cardboard card (1a) shown in FIG. 2d, the retrievable titles are printed in a text field (16). On a second inner side (17), a personal message to a recipient of the cardboard card (1a) is printed in a text field (18).

Figure 3:
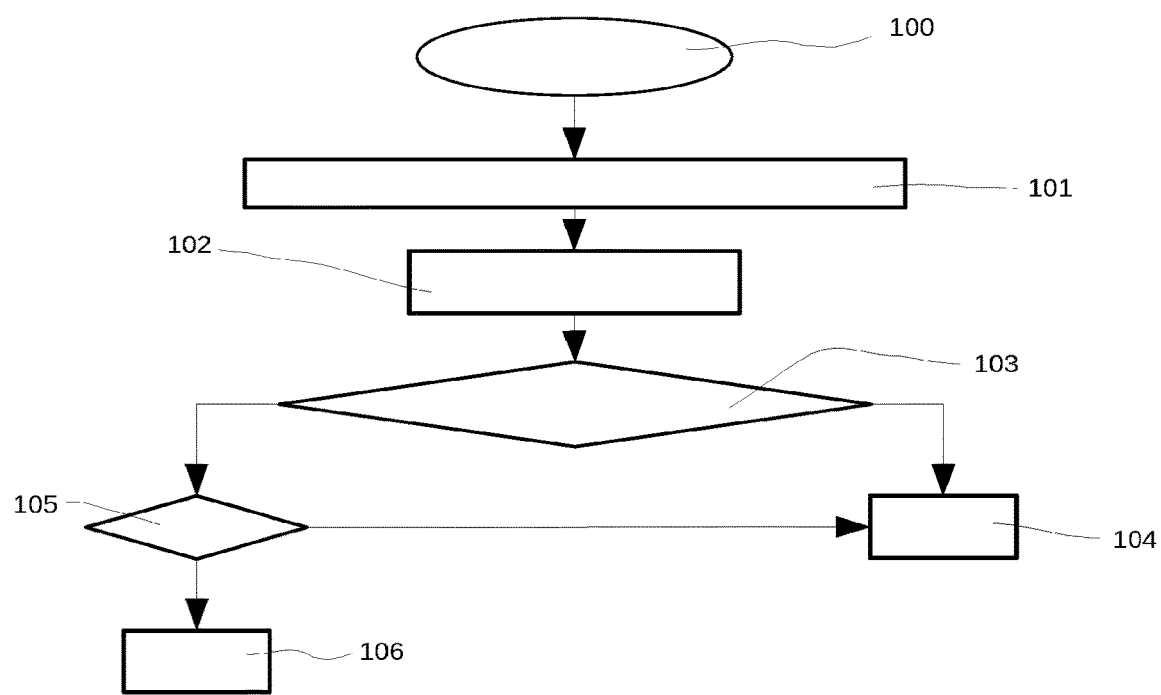

Reference is now made to FIG. 3, where identical or equal-acting parts are designated with the same reference number as in FIG. 1, and the letter b is added to the respective reference number.

In a flowchart shown in FIG. 3 for verifying whether authorization to retrieve electronically provided content exists, a user of the sales item reads an NFC transponder with an NFC-enabled cell phone in a first process step (100). Thereby, a dynamic URL (Uniform Resource Locator) is generated in a subsequent process step (101) with information stored in the NFC transponder—for example by an application program ("app") executed on the cell phone—which has the following components:

a base URL at which a server can be reached, which is set up for the retrieval of a sales item state, a release of a content and a check of subsequently designated, retrieval-relevant parameters:

a unique identifier (ID) related to the NFC transponder or a specific sales item, which may be an alphanumeric string.

a counter value, which is a usage counter that is incremented by 1 for each retrieval, with a new counter value stored on the NFC transponder an on the server from which the content is retrievable.

a sales item state—basic state or full access state—, where the basic state can be a value 0 and the full access state can be a value 1.

a hash value created using the signature key stored on the NFC transponder, for which the base URL and dynamic portions of the URL, in particular the identifier (ID), the counter value, and the sales item state are hashed. Advantageously, another security mechanism is included in the dynamic URL that secures preceding security features.

A dynamic URL in which security features are separated by hyphens may be designed as follows:

https://base-URL/ID-countervalue-salesitemstate-signature-hashvalue/

The URL generated in this way is then accessed in a further method step (102). The server, which is designed as a web server, determines whether the associated ID relating to the NFC transponder or to the item is stored in a database in the computer network and if all other security features are correct (103).

If one of the checked parameters is incorrect or deviates from a value stored in the database, an error page is displayed in a browser or app of the cell phone or only a preview of the retrievable content, for example the first 20 seconds of a music track, is transmitted to the cell phone (104).

If all checked parameters correspond to those stored on the server, the server can check whether the sales item is in a basic sales item state or in a full access sales item state (105). In the basic sales item state, a preview of the content is transmitted to the cell phone (104).

If the sales item is in a full access sales item state, data is transferred from the server, that means existing music tracks can be selected for listening and can be played back (106).

It is conceivable that a sales item state is checked first. Advantageously, a preview of a retrievable content can be displayed immediately. A verification of authorization, which for example requires a determination of a signature, is not necessary.

It is also conceivable that parts of a retrievable content, for example music tracks, can be deleted, others added or changed.

Furthermore, it is conceivable that the entire retrievable content or parts are encrypted and can only be decrypted in the full access sales item state in case of an authorized retrieval.

The invention claimed is:

1. A method for verifying an authorization to retrieve an electronically provided music or video stream by reading an information carrier (2; 2a) of a sales item (1; 1a) characterized in that by reading the information carrier (2; 2a), a dynamic address to a server in a computer network is created, which address has at least one security feature and which address depends on a sales item state and when the dynamic address is created, a unique identifier characteristic of the sales item (1; 1a) and/or the information carrier (2; 2a) is integrated into the dynamic address, wherein before transmission of a music or video stream, it is checked whether the dynamic address at which the content is to be retrieved is authorized to retrieve the music or video stream.

2. A method for verifying an authorization to retrieve an electronically provided music or video stream by reading an information carrier (2; 2a) of a sales item (1; 1a) characterized in that by reading the information carrier (2; 2a), a dynamic address to a server in a computer network is created, which address has at least one security feature and which address depends on a sales item state and when the dynamic address is created, a unique identifier characteristic of the sales item (1; 1a) and/or the information carrier (2; 2a) is integrated into the dynamic address, wherein the information carrier (2; 2a) is read by a reader, and a sales item state is displayed on a screen of the reader and/or a video or music stream which can be accessed via the computer network is streamed on the reader.

3. A method for verifying an authorization to retrieve an electronically provided music or video stream by reading an information carrier (2; 2a) of a sales item (1; 1a) characterized in that by reading the information carrier (2; 2a), a dynamic address to a server in a computer network is created, which address has at least one security feature and which address depends on a sales item state and when the dynamic address is created, a unique identifier characteristic of the sales item (1; 1a) and/or the information carrier (2; 2a) is integrated into the dynamic address, wherein an at least partially encrypted music or video stream retrievable at the dynamic address is decrypted by a key stored on the information carrier (2; 2a).

4. A method for verifying an authorization to retrieve an electronically provided music or video stream by reading an information carrier (2; 2a) of a sales item (1; 1a) characterized in that by reading the information carrier (2; 2a), a dynamic address to a server in a computer network is created, which address has at least one security feature and which address depends on a sales item state and when the dynamic address is created, a unique identifier characteristic of the sales item (1; 1a) and/or the information carrier (2; 2a) is integrated into the dynamic address, wherein a music or video stream retrievable at the dynamic address is modified by a user input on the reader and it is checked by means of dynamic address whether the music or video stream is intended to be modified.

5. A method for verifying an authorization to retrieve an electronically provided music or video stream by reading an information carrier (2; 2a) of a sales item (1; 1a) characterized in that by reading the information carrier (2; 2a), a dynamic address to a server in a computer network is created, which address has at least one security feature and which address depends on a sales item state and when the dynamic address is created, a unique identifier characteristic of the sales item (1; 1a) and/or the information carrier (2; 2a) is integrated into the dynamic address, wherein a music or video stream retrievable at the dynamic address is modified by a user input on the reader, said modification being possible only after an irreversible change of state.

* * * * *